United States Patent [19]
Kaji

[11] Patent Number: 4,682,211
[45] Date of Patent: Jul. 21, 1987

[54] COLOR IMAGE SENSING APPARATUS WITH ONE NON-FEEDBACK CLAMP CIRCUIT AND AT LEAST ONE FEEDBACK CLAMP CIRCUIT

[75] Inventor: Toshio Kaji, Yokohama, Japan

[73] Assignee: Canon Kabushiki Kaisha, Tokyo, Japan

[21] Appl. No.: 694,239

[22] Filed: Jan. 24, 1985

[30] Foreign Application Priority Data

Jan. 27, 1984 [JP] Japan ................................. 59-13155

[51] Int. Cl.$^4$ ..................... H04N 9/04; H04N 9/07; H04N 9/09; H04N 9/64
[52] U.S. Cl. ........................................ 358/41; 358/34; 358/40; 358/43; 358/50
[58] Field of Search ................... 358/34, 40, 41, 43, 358/44, 228, 50

[56] References Cited
U.S. PATENT DOCUMENTS
4,473,839 9/1984 Noda ...................................... 358/41

FOREIGN PATENT DOCUMENTS
145277 8/1983 Japan ....................................... 358/44

Primary Examiner—James J. Groody
Assistant Examiner—Randall S. Svihla
Attorney, Agent, or Firm—Fitzpatrick, Cella, Harper & Scinto

[57] ABSTRACT

An image sensing apparatus including an image sensor for converting light representing an optical image to an image signal; processing circuits for processing R, G and B component signals of the image signal; a non-feedback clamp circuit for clamping the G component signal to a fixed reference level; two feedback clamp circuits for clamping the R and B component signals to levels determined on the basis of the levels of the processed clamped R and B component signals, respectively; and an automatic exposure controller for controlling the amount of light incident on the image sensor in accordance with the level of the clamped processed G component signal. The apparatus decreases the time it takes for the automatic exposure controller to respond when the apparatus is first turned on.

16 Claims, 4 Drawing Figures

COLOR IMAGE SENSING APPARATUS WITH ONE NON-FEEDBACK CLAMP CIRCUIT AND AT LEAST ONE FEEDBACK CLAMP CIRCUIT

BACKGROUND OF THE INVENTION

1. Field of the Invention

The present invention relates to an image sensing apparatus in which an image signal processing system of a plurality of systems is provided with a clamp circuit for use in a video camera or the like, particularly, a clamp circuit having a feedback loop and an ordinary clamp circuit.

2. Description of the Prior Art

For example, in an image sensing apparatus such as a video camera, the light from a subject is incident onto an image sensor through a lens system and is photoelectrically converted to image information by the image sensor. The information regarding three primary colors or R(red), G(green) and B(blue) obtained from the image information of the subject is supplied to a chrominance signal processor.

In order to accurately perform the wavefor processes for an image signal, such as addition of pedestal components, clipping, gamma correction, etc. in the chrominance signal processor, a clamping operation to constantly fix the black level of the image signal to a reference level is executed. A feedback clamp circuit is generally used to carry out this clamping operation.

A feedback clamp circuit which is used so far will be described with reference to FIG. 1. In this drawing, a reference symbol A denotes an input terminal. An image signal applied to the input terminal A is input to an image signal processor 11 and is subjected to image signal processes such as a gain control and the like by the processor 11, thereafter the image signal is output from an output terminal B to a signal processor at the post stage. A gate pulse is applied to a gate switch 13 for the optical black interval. When the gate switch 13 is closed, a potential at the point B is held by a capacitor $C_2$. In this state, the output of the processor 11 is input to the inverting input terminal of a comparator 14 and is compared with a reference voltage input to the non-inverting input terminal, so that the deviation voltage is held by a capacitor $C_1$. A clamp pulse is applied to a gate switch 15 for the horizontal blanking interval to connect the gate switch 15, so that the voltage held in the capacitor $C_1$ is fed back to the point A and is clamped, thereby fixing a potential at the point B to the reference level.

However, this feedback clamp circuit serves to hold the input voltage into the capacitor and the time constant circuit consisting of R and C is equivalently constituted by the resistances which those circuit elements have. Therefore, there is a drawback such that even if a power switch of the image sensing apparatus having such a feedback clamp circuit is turned on, its leading time is slow when compared with an ordinary pulse clamp circuit.

On the other hand, in an image sensing apparatus with an automatic diaphragm which is equipped with an automatic light control system (ALC), a signal processor to perform the automatic light control is connected to the post stage of the foregoing feedback clamp circuit. However, due to a slow leading time of the feedback clamp circuit, the operation of the automatic light control system is also obviously delayed.

Consequently, it is impossible to immediately photograph after the power switch of the image sensing apparatus is turned on. Thus, even in the case where the automatic diaphragm mechanism is utilized to provide an easy operating function for the image sensing apparatus, its use method is restricted. In addition, there are cases where photographic opportunities will have been lost.

Further, there is a drawback that the number of pins increases in making the feedback clamp circuit as an IC for reduction in size of the image sensing apparatus.

SUMMARY OF THE INVENTION

An object of the present invention is to eliminate the problems in the foregoing conventional technology.

Another object of the present invention is to provide an image sensing apparatus having a small number of pins when made into an IC of a clamp circuit.

Still another object of the present invention is to provide an image sensing apparatus having an excellent response speed.

To accomplish the above objects, in an embodiment according to the present invention, an ordinary clamp circuit is used in at least one system of feedback clamp circuits of several systems, and an output voltage of this ordinary clamp circuit is set as a reference potential for the other feedback clamp circuits, thereby reducing the number of pins when the circuit apparatus is made as an IC. Also, by connecting the circuit apparatus of an automatic light control system to the post stage of the ordinary clamp circuit, its leading time can be increased.

Other objects and features of the present invention will be apparent from the following detailed description in conjunction with the accompanying drawings.

DETAILED DESCRIPTION OF THE PREFERRED EMBODIMENT

An example of the means which the present invention adopted to attain the foregoing objects will now be described hereinbelow with reference to the accompanying drawings.

Figure 1:
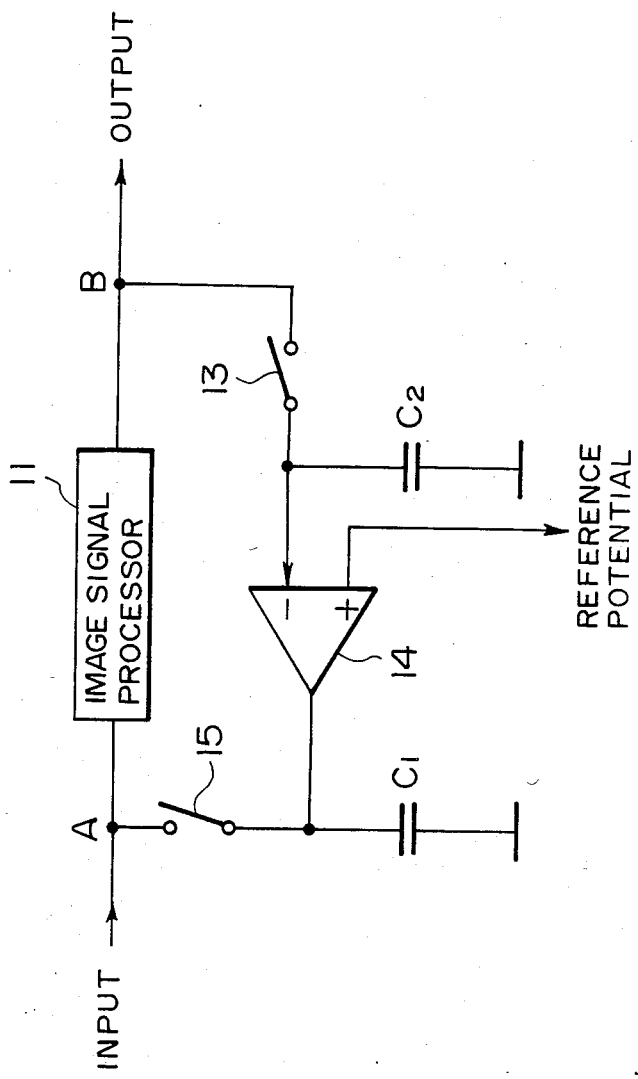
FIG. 1 is a block diagram of a conventional feedback clamp circuit.
Figure 2:
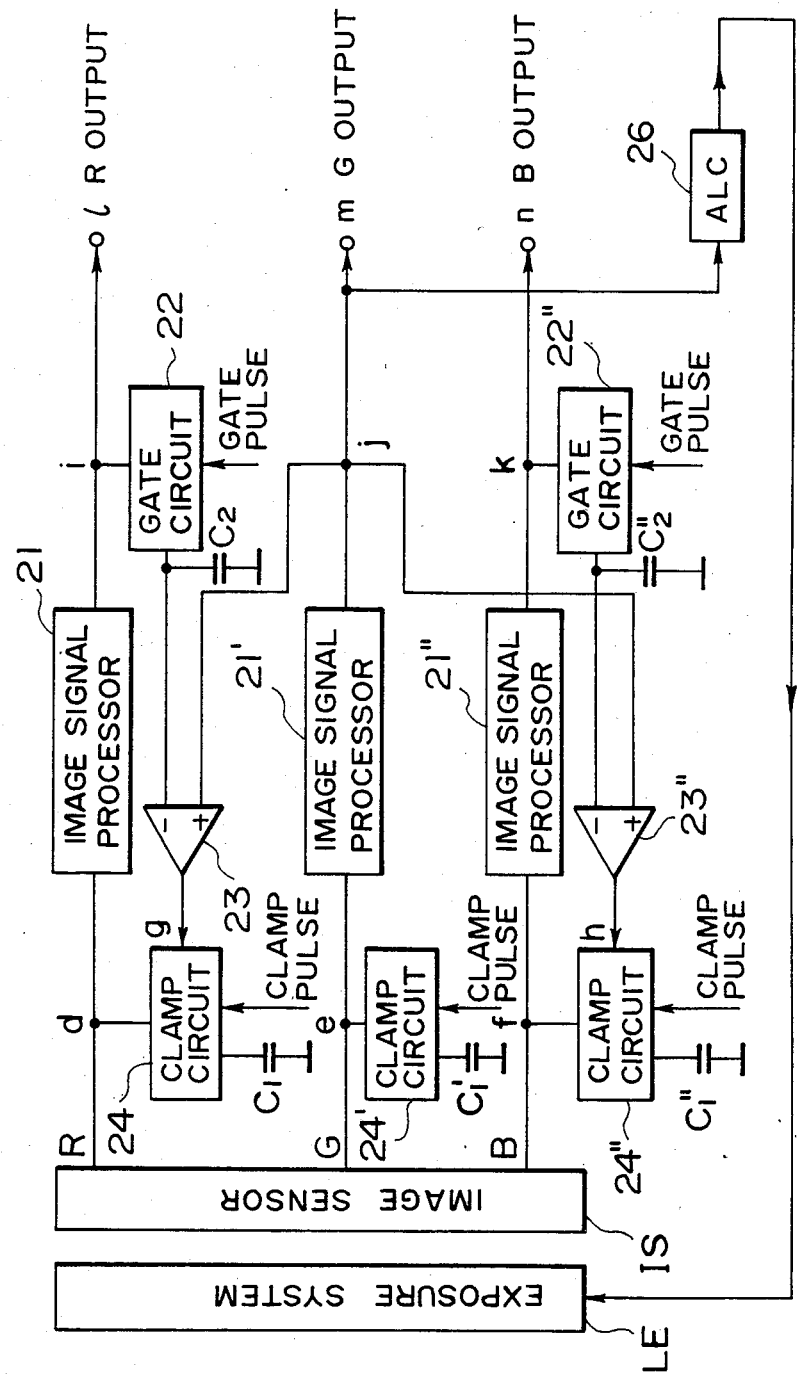
FIG. 2 is a block diagram of an embodiment of an image sensing apparatus according to the present invention.
Figure 3A:
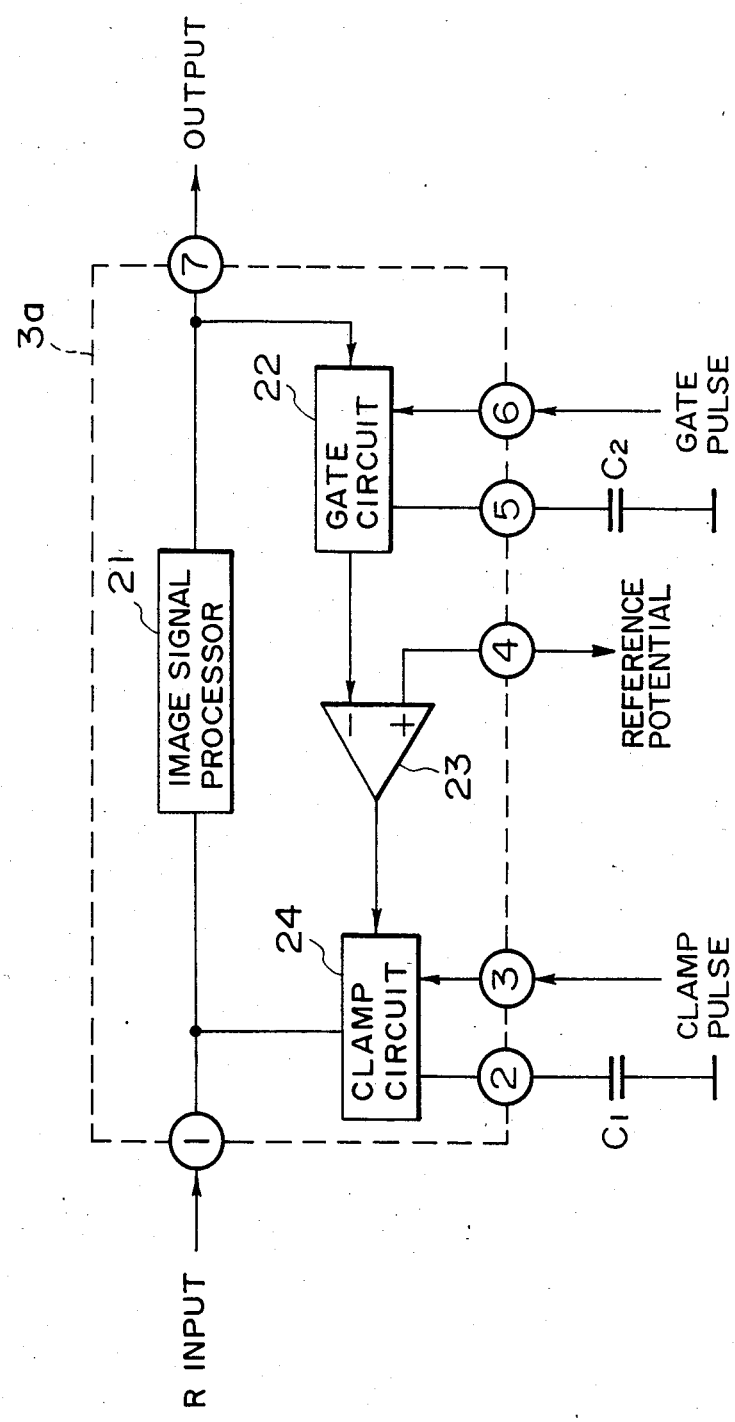
FIG. 3A is a circuit diagram showing a feedback clamp circuit and the number of terminal pins when this circuit is made as an IC.
Figure 3B:
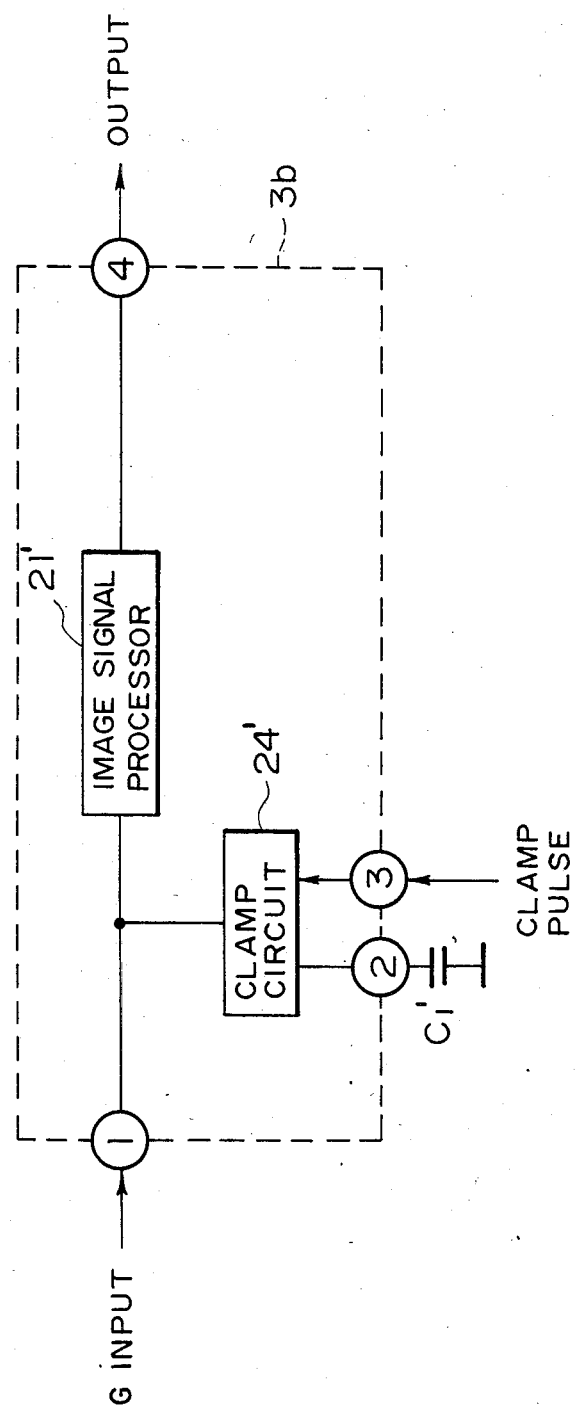
FIG. 3B is a circuit diagram showing an ordinary clamp circuit and the number of terminal pins when this circuit is made as an IC.

FIG. 2 shows a block diagram of an embodiment of an image sensing apparatus according to the present invention. FIGS. 3A and 3B show circuit diagrams of a feedback clamp circuit and an ordinary clamp circuit, respectively, for explaining the number of pins which are needed when these clamp circuits are made as ICs.

In FIG. 2, reference symbol IS denotes an image sensor as image sensing means for converting an optical image to an electrical signal, and reference symbol LE indicates an exposure system having a diaphragm, shutter or the like for changing the exposure state to the image sensor IS. Reference numerals 21, 21' and 21" represent image signal processors serving as signal processing means for performing the gain control, clipping, gamma correction, etc. with respect to chrominance signals R(red), G(green) and B(blue) of three systems which are derived from the image sensor IS. Reference symbols l, m and n denote output terminals from which the R, G and B signals are sent which signals were waveform processed by the image signal processors 21, 21' and 21".

Numerals 22 and 22" are gate circuits. Gate pulses are supplied to these gate circuits 22 and 22" during the optical black interval and the output voltages at points i and k of the respective image signal processors 21 and 21" are held in capacitors $C_2$ and $C_2''$, respectively.

Numerals 23 and 23" are differential amplifiers. The G signal which was signal processed by the image signal processor 21' is input as a reference level signal to non-inverting input terminals of the differential amplifiers 23 and 23". The differential amplifiers 23 and 23" compare the amplitude of this reference signal with the amplitudes of the voltages of the capacitors $C_2$ and $C_2''$ applied to inverting input terminals of the differential amplifiers 23 and 23"and then apply the deviation voltages g and h to clamp circuits 24 and 24" as second clamping means, respectively. The clamp circuits 24 and 24" serve to hold the input deviation voltages g and h in the capacitors $C_1$ and $C_1''$, thereby clamping the potentials at point d to which the R signal is supplied and at point f to which the B signal is supplied to the output potential at point j of the image signal processor 21' due to clamp pulses which are applied for the horizontal blanking interval.

On the other hand, a clamp circuit 24' serving as first clamping means is provided with a reference voltage generator (not shown) for generating a constant reference voltage. This constant reference voltage is held by a capacitor $C_1'$. Therefore, by supplying a clamp pulse to the clamp circuit 24' for the horizontal blanking interval, the potential at point e is clamped to the reference voltage held in the capacitor Chd 1'.

An output of the image signal processor 21' for performing the image signal process with regard to the G signal is further led to the output terminal m and is also supplied to an automatic light controller (ALC) 26 serving as control means for controlling the exposure state for the image sensor IS. The exposure system LE consisting of a diaphragm, shutter or the like is controlled in response to the output of the controller 26.

As described above, an ordinary clamp circuit is provided as first clamping means to the system in which the G signal is input and the feedback clamp circuits are provided as second clamping means to the systems in which the R and B signals are input. However, the present invention is not limited to this arrangement but an ordinary clamp circuit may be provided for at least either one of the systems in which the R, G and B signals are input and the feedback clamp circuits may be provided for the other two systems. However, it is desirable to provide the ordinary clamp circuit in the system of the G signal because the G signal system is more approximate to the luminance signal. In this case, the automatic light controller 26 is connected to the system in which the ordinary clamp circuit is provided.

The operation of the image sensing apparatus with such an arrangement will now be described.

The chrominance signals of three systems of, e.g., R, G and B are generated from the image sensor IS. These chrominance signals are input through the points d, e and f to the image signal processors 21, 21' and 21" and are subjected to the signal processes such as the gain control, gamma correction, clipping, etc. in these processors. Thereafter, those signals are input through the output terminals l, m and n to blanking circuits and the like (not shown) connected at the post stage of each output terminal.

The G signal output from the image signal processor 21' is input through the point j to the non-inverting input terminals of the differential amplifiers 23 and 23" in the feedback clamp circuits provided in the R and B signal input systems and is also supplied to the automatic light controller 26 serving as control means for controlling the exposure condition. On one hand, an output of the ALC 26 is used to control the exposure system LE of the image sensor IS. The gate pulses are supplied to the gate circuits 22 and 22" for the optical black interval during the horizontal blanking interval. When those gate circuits are closed, the optical black levels of the output voltages at the points i and k of the R and B signals from the image signal processors 21 and 21" are held in the capacitors $C_2$ and Chd 2". The holding times of the capacitors $C_2$ and $C_2''$ are set to sufficiently longer values than one horizontal interval on the basis of the relations with an input resistance $R_i$ of the differential amplifiers 23 and 23". The differential amplifiers 23 and 23" compare the voltages of the capacitors $C_2$ and $C_2''$ applied to the inverting input terminals of these differential amplifiers with the potential at the point j applied to their non-inverting input terminals. The deviation voltages g and h are input to the clamp circuits 24 and 24" and are held in the capacitors $C_1$ and $C_1''$, respectively. When the clamp pulses are input to the clamp circuits 24 and 24" for the horizontal blanking interval, the potentials at the points d and f are clamped to the deviation voltages g and h held in the capacitors $C_1$ and $C_1''$, respectively. In other words, the potentials at the points d and f are feedback-clamped to the voltage at the point j on the output side of the image signal processor 21' of the G signal input system.

On the other hand, the clamp circuit 24' of the G signal input system holds a constant reference voltage from a reference voltage source (not shown) in the clamp circuit 24' in the capacitor $C_1'$, thereby clamping the potential at the point e due to the reference voltage held in the capacitor $C_1'$ when the clamp pulse is likewise supplied for the horizontal blanking interval.

As will be obviously understood from the are provided in the foregoing description, the feedback clamp circuits R and B signal input systems and the ordinary clamp circuit is provided in the G signal input system. On one hand, the leading time until the feedback clamp circuits enter the normal operating states after the power switch of the image sensing apparatus was turned on is longer than that of the ordinary clamp circuit. Consequently, the output signals of the feedback clamp circuits are improper when they are used as control signals for, e.g., the automatic light control system or the like in which the accurate operation is required immediately after the power switch of the image sensing apparatus was turned on.

However, in the above-mentioned embodiment of the invention, the output of the image signal processor 21' of the G signal input system having the ordinary clamp circuit 24' is applied to the automatic light controller 26; therefore, the output voltage at the point j of the G signal system is regulated in a short time, thereby enabling the exposure control to be carried out at a high leading speed.

In addition, since the voltage at the point j is applied as a reference voltage to the noninverting input terminals of the differential amplifiers 23 and 23'' of the R and B signal input systems, a variation in voltage at the point j causes the clamp potentials at the points d and f to be changed. Consequently, the respective clamp characteristics of R, G and B become substantially equal and do not cause a deviation in hue or the like.

An effect in dependence upon the number of pins in the case where the feedback clamp circuit and ordinary clamp circuit are made as ICs will then be described with reference to FIGS. 3A and 3B.

The feedback clamp circuit shown in FIG. 3A and the ordinary clamp circuit shown in FIG. 3B have the same component elements and the same functions as those of the feedback clamp circuit of the R signal input system and of the ordinary clamp circuit 24' of the G input system shown in FIG. 2. Therefore, those component elements are designated by the same reference numerals and the descriptions of their arrangements and functions are omitted.

In FIG. 3A, the portion indicated by a broken line 3a is constituted as an IC.

In the diagram, reference numeral ① denotes a terminal pin to which the R signal is input; ② is a terminal pin of an externally attached capacitor $C_1$ for holding the deviation voltage of the differential amplifier 23; ③ a terminal pin through which the clamp pulse is applied to the clamp circuit 24; ④ a terminal pin through which the reference voltage at the point j in FIG. 2, is applied; ⑤ a terminal pin of the externally attached capacitor $C_2$ for holding the output voltage from the image signal processor 21 through the gate circuit 22; ⑥ a terminal pin through which the gate pulse is applied to the gate circuit 22; and ⑦ a terminal pin through which the output signal of the image signal processor 21 is applied to a signal processor (not shown) at the post stage.

As described above, the feedback clamp circuit shown in FIG. 3A needs seven terminal pins when it is made as an IC.

In FIG. 3B, the portion indicated by a broken line 3b is constituted as an IC.

In the diagram, reference numeral ① represents a terminal pin to which the G signal is input; ② is a terminal pin of the externally attached capacitor $C_1'$ for holding the reference voltage from a reference voltage source (not shown) provided in the clamp circuit 24'; ③ a terminal pin through which the clamp pulse is input to the clamp circuit 24'; and ④ a terminal pin through which the output signal from the image signal processor 21'; is output to a signal processor (not shown) connected at the post stage.

As described above, four terminal pins are needed to make the ordinary clamp circuit shown in FIG. 3B as an IC.

In comparison between the number of pins in case of constituting the feedback clamp circuit shown in FIG. 3A as an IC and the number of pins in case of constituting the ordinary clamp circuit shown in FIG. 3B as an IC, it will be understood that the number of terminal pins of the ordinary clamp circuit shown in FIG. 3B is far smaller than that of the feedback clamp circuit shown in FIG. 3A.

Consequently, by providing the ordinary clamp circuit for at least one of the R, G and B signal input systems, an arrangement of an IC can be simplified.

Obviously, the invention shown in the foregoing embodiment can be applied to any other image sensing apparatus using an image pickup tube of the single tube type, image pickup tubes of the double or triple tube type, or solid state image sensor.

Further, the output of the image sensor may be divided into the systems of R, G, Cy, and the like in place of dividing it into three systems of R, G and B and processing them. The invention is not limited to the combination of the foregoing embodiment. In addition, the reference voltage which is applied to the differential amplifiers 23 and 23'' may be constant; however, in this case, there is a possibility of occurrence of deviation in hue since the clamp characteristics of the R and B systems and of the G system differ.

As described above, according to the present invention, ordinary clamping means is provided for at least one of a plurality of input signal systems and feedback clamping means are provided for the other systems, and at the same time control means for allowing the exposure control for the image sensing means to be automatically performed is provided at the post stage of the ordinary clamping means. Due to this arrangement, it is possible to provide an image sensing apparatus in which the response speed of the leading characteristic of the exposure control system after the power switch of the image sensing apparatus was turned on can be increased and the regulated reference voltage can be promptly applied to the other systems, and at the same time the number of terminal pins is reduced in case of producing an IC and the cost of the apparatus is decreased.

What I claim is:

1. An image signal processing apparatus comprising:
   (a) a plurality of channels for respectively processing different component signals of an image signal;
   (b) a plurality of clamping means for respectively clamping the component signals in the respective channels;
   (c) feedback means provided for at least one, but not all, of said channels, each said feedback means for feeding back the respective clamped component signal to an input of the respective clamping means; and
   (d) level control means for controlling the level of said image signal on the basis of the component signal in a channel for which a feedback means is not provided.

2. An apparatus according to claim 1, wherein said different component signals are different predetermined chrominance signals.

3. An apparatus according to claim 2, wherein said different predetermined chrominance signals are R, G and B signals.

4. An apparatus according to claim 1, wherein each said feedback means sets a clamp level for the respective channel in accordance with the level of the clamped component signal in the respective channel.

5. An apparatus according to claim 1, wherein each said feedback means sets a clamp level for the respective channel in accordance with the level of the component signal in the channel for which a feedback means is not provided.

6. An apparatus according to claim 1, wherein the channel for which a feedback means is not provided processes a G component signal.

7. An apparatus according to claim 1, further comprising image sensing means for generating said image signal.

8. An apparatus according to claim 7, wherein said level control means controls the amount of light incident on said image sensing means.

9. An apparatus according to claim 8, wherein said level control means includes a diaphragm.

10. An image sensing apparatus comprising:
 (a) image sensing means for generating an image signal;
 (b) a plurality of channels for respectively processing different component signals of the image signal;
 (c) non-feedback clamping means for clamping a respective component signal in a first one of said channels to a constant level without the use of feedback;
 (d) at least one feedback clamping means, each said feedback clamping means for clamping a respective component signal in at least a second one of said channels with the use of feedback; and
 (e) level control means for controlling the level of the image signal generated by said image sensing means on the basis of the component signal processed by said first channel.

11. An apparatus according to claim 10, wherein said different component signals are different predetermined chrominance signals.

12. An apparatus according to claim 11, wherein said different predetermined chrominance signals are R, G and B signals.

13. An apparatus according to claim 10, wherein each said feedback clamping means causes a clamp level for the respective channel to be changed in accordance with the respective component signal in the respective channel.

14. An apparatus according to claim 10, wherein said first channel processes a G component signal.

15. An apparatus according to claim 10, wherein said level control means controls the amount of light incident on said image sensing means.

16. An apparatus according to claim 15, wherein said level control means includes a diaphragm.

* * * * *